(12) United States Patent
Taya

(10) Patent No.: US 11,146,110 B2
(45) Date of Patent: Oct. 12, 2021

(54) POWER RECEPTION DEVICE

(71) Applicant: LAPIS Semiconductor Co., Ltd., Yokohama (JP)

(72) Inventor: Takashi Taya, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/825,454

(22) Filed: Mar. 20, 2020

(65) Prior Publication Data

US 2020/0313462 A1 Oct. 1, 2020

(30) Foreign Application Priority Data

Mar. 28, 2019 (JP) .............................. JP2019-063474

(51) Int. Cl.
*H02J 50/12* (2016.01)
*H02J 7/02* (2016.01)

(52) U.S. Cl.
CPC ................ *H02J 50/12* (2016.02); *H02J 7/02* (2013.01)

(58) Field of Classification Search
CPC ........... H02J 50/12; H02J 7/02; H02J 2007/20
USPC ......................................................... 307/104
See application file for complete search history.

(56) References Cited

U.S. PATENT DOCUMENTS

2013/0099588 A1* 4/2013 Yeo .......................... H02J 50/10
307/104
2018/0337528 A1* 11/2018 Taya ........................ H02J 50/80

FOREIGN PATENT DOCUMENTS

JP 6443608 B1 12/2018

* cited by examiner

*Primary Examiner* — John W Poos
(74) *Attorney, Agent, or Firm* — Rabin & Berdo, P.C.

(57) ABSTRACT

A power reception device has: a rectifier circuit that generates a direct current voltage by having applied thereto an alternating current voltage, and has first and second output terminals that output the direct current voltage; a transistor, the drain and source of which are connected to the first and second output terminals; a gate driver circuit that controls the gate voltage of the transistor according to the voltage between the first and second output terminals; and a capacitor that has a first end that is connected to the drain of the transistor and a second end that is connected to the gate of the transistor.

8 Claims, 6 Drawing Sheets

POWER RECEPTION DEVICE

TECHNICAL FIELD

The present invention relates to a power reception device that receives power wirelessly from an external power transmission device.

BACKGROUND ART

In recent years, techniques for wirelessly (or contactlessly) supplying power to batteries of various electronic devices such as smartphones, tablets, and electronic pens have become more common (see Japanese Patent No. 6443608, for example). Wireless power supply can be achieved by performing power transmission through the medium of a magnetic field, for example.

SUMMARY OF THE INVENTION

Wireless power supply system have the problem that, despite the many advantages such as greatly increased convenience, the power supply is unstable. One example of such instability in the power supply is a great increase or decrease temporarily of the intensity of a magnetic field that serves as the transmission medium. In such a case, a voltage that deviates from the standard value is applied to the reception-side device, which means that there are cases in which it is difficult to supply power in an accurate manner to the battery, for example.

In particular, if a temporarily large magnetic field is applied to the reception-side device, a large voltage is generated in the device. If this happens, a large voltage is also applied to other load circuits that operate on an operating voltage not only from the battery but from the received voltage, which can cause unstable operation of the load circuits as well as damage to the circuit and elements in the circuit.

The present invention takes into consideration this problem, and an object thereof is to provide a power reception device that can limit the supply of reception voltage to a load circuit with a high degree of responsiveness even if the reception voltage were to suddenly increase.

A power reception device according to the present invention includes: a rectifier circuit that is configured to generate a direct current voltage by application thereto of an alternating current voltage, and that has first and second output terminals that are configured to output the direct current voltage; a transistor having a drain and a source that are connected to the first and second output terminals; a gate driver circuit that is configured to control a gate voltage of the transistor according to a voltage between the first and second output terminals; and a capacitor having a first end connected to the drain of the transistor and a second end connected to the gate of the transistor.

In the power reception device of the present invention, immediately after a sudden increase in the reception voltage, the increase in voltage in the capacitor results in the transistor becoming conductive, resulting in the output voltage being limited. Then, by the current source circuit controlling the gate voltage of the transistor, the output voltage is limited. As a result, the voltage can be limited with a high degree of responsiveness even to a sudden increase in reception voltage, for example. Thus, the output voltage is stabilized.

DETAILED DESCRIPTION OF EMBODIMENTS

Below, embodiments of the present invention will be explained in detail.

Embodiment 1

Figure 1:
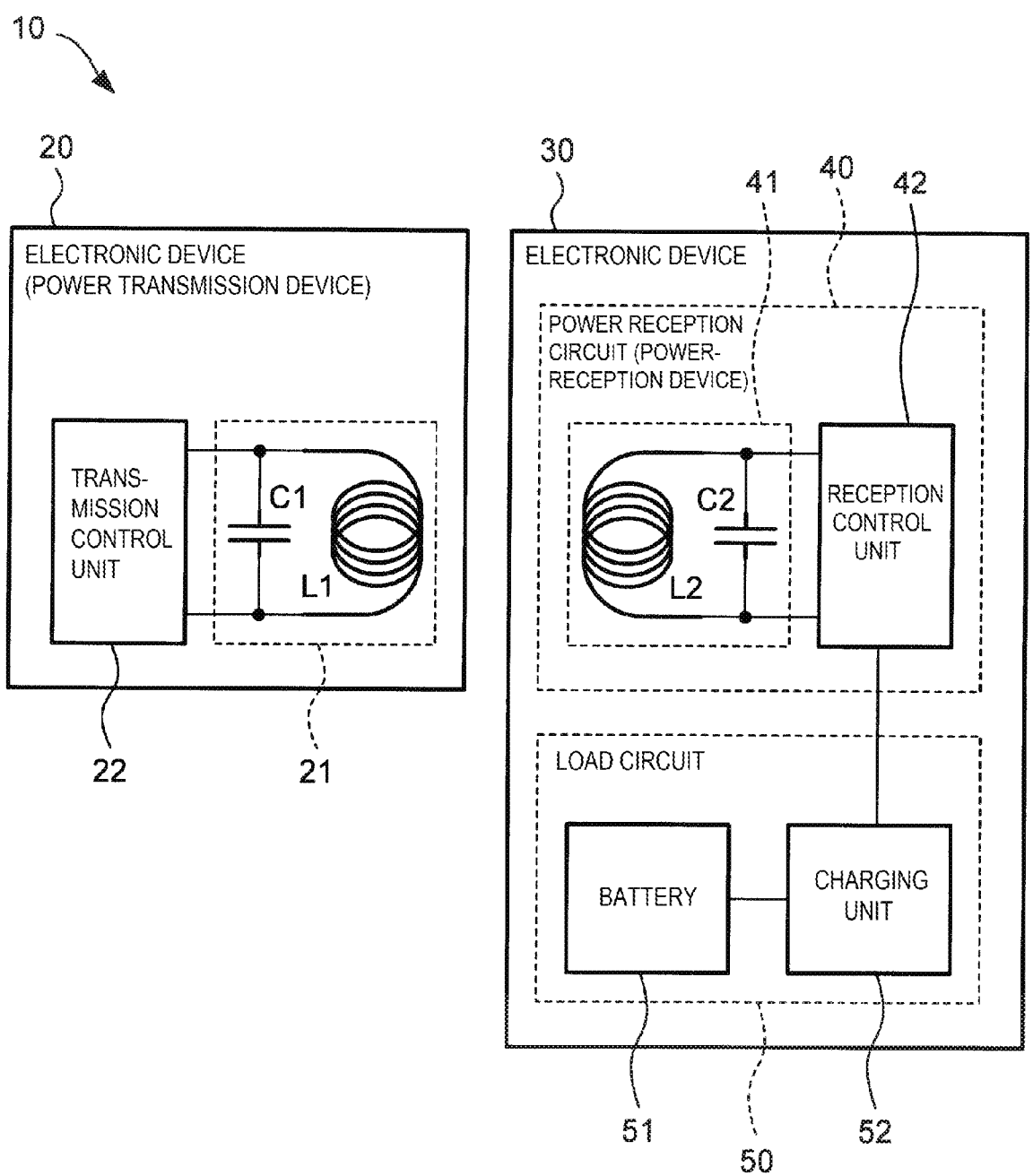
FIG. 1 is a block diagram of an electronic system including a power transmission device and a power reception device according to Embodiment 1.

FIG. 1 is a block diagram of an electronic system 10 according to Embodiment 1. In the present embodiment, the electronic system 10 includes an electronic device 20 having only a wireless power transmission function, and an electronic device 30 that includes a power reception device 40 that receives power transmitted from the electronic device 20. Also, the electronic system 10 performs power transmission through an alternating current magnetic field between the electronic devices 20 and 30.

In the present embodiment, the electronic device 20 only has the function of transmitting power, and thus, functions as a power transmission device. The electronic device 20 is, for example, a table (charging stand) that can wirelessly supply power. The electronic device 20 discharges (outputs) power magnetically not only to the electronic device 30 but to the space in the vicinity of the electronic device 20. As long as the electronic device 20 has the power transmission function, it may have other functions as well.

In the present embodiment, the electronic device 20 has a resonance circuit 21 including a coil L1 and a capacitor C1. The resonance circuit 21 performs electromagnetic conversion, and in the present embodiment, generates an alternating current magnetic field through the application of a voltage. The resonance circuit 21 functions as the power transmission unit in the electronic device 20. The resonance circuit 21 has a resonant frequency of 13.56 MHz, for example. However, embodiments of the invention are not limited to a frequency of 13.56 MHz, but alternative embodiments may include any frequency according to the requirements of the system.

Also, the electronic device 20 has a transmission control unit 22 that applies an alternating current voltage to the resonance circuit 21 and controls the voltage characteristics thereof. The transmission control unit 22 generates an alternating current voltage by being connected to an external power source of the electronic device 20 and receiving power from the external power source, for example. The transmission control unit 22 supplies the generated alternating current voltage to the resonance circuit 21.

In one embodiment, the transmission control unit 22 supplies the 13.56 MHz alternating current voltage to the resonance circuit 21, for example. As a result, the electronic device 20 outputs an alternating current magnetic field of 13.56 MHz from the resonance circuit 21. In the present embodiment, the coil L1 of the resonance circuit 21 functions as a transmission antenna that outputs the alternating current magnetic field as power. In this manner, the electronic device 20 outputs the alternating current magnetic field.

Also, the electronic device 30 has a power reception device 40 that functions as the reception circuit of the electronic device 30, and a load circuit 50 that consumes the power received by the power reception device 40. In the present embodiment, the load circuit 50 has a battery 51 that serves as an operating power source for other functional elements (not shown) in the electronic device 30, and a charging unit 52 that charges the battery 51. The electronic device 30 is, for example, a smartphone, a tablet, a smartwatch, an electronic pen, or the like.

Also, in the present embodiment, the power reception device 40 has a resonance circuit 41 including a coil L2 and a capacitor C2. The resonance circuit 41 performs electromagnetic conversion, and in the present embodiment, generates an alternating current voltage through the application of a magnetic field. The resonance circuit 41 functions as the power reception unit in the power reception device 40. The resonance circuit 41 has a resonant frequency of 13.56 MHz, for example.

Also, the coil L2 of the resonance circuit 41 is configured to be magnetically coupled to the coil L1 of the electronic device 20 (power transmission device) as a result of the electronic device 30 being disposed in the vicinity of the electronic device 20. In other words, the coil L2 functions as a reception antenna that receives the alternating current magnetic field as power.

The power reception device 40 has a reception control unit 42 that converts the alternating current voltage generated by the resonance circuit 41 into a direct current voltage and controls the voltage characteristics thereof. The reception control unit 42 supplies the converted direct current voltage to the operating voltage (power source voltage) of the load circuit 50. In this manner, the power reception device 40 receives the alternating current magnetic field and outputs a direct current voltage. The battery 51 of the electronic device 30 is charged by the direct current voltage outputted by the power reception device 40, for example.

Figure 2:
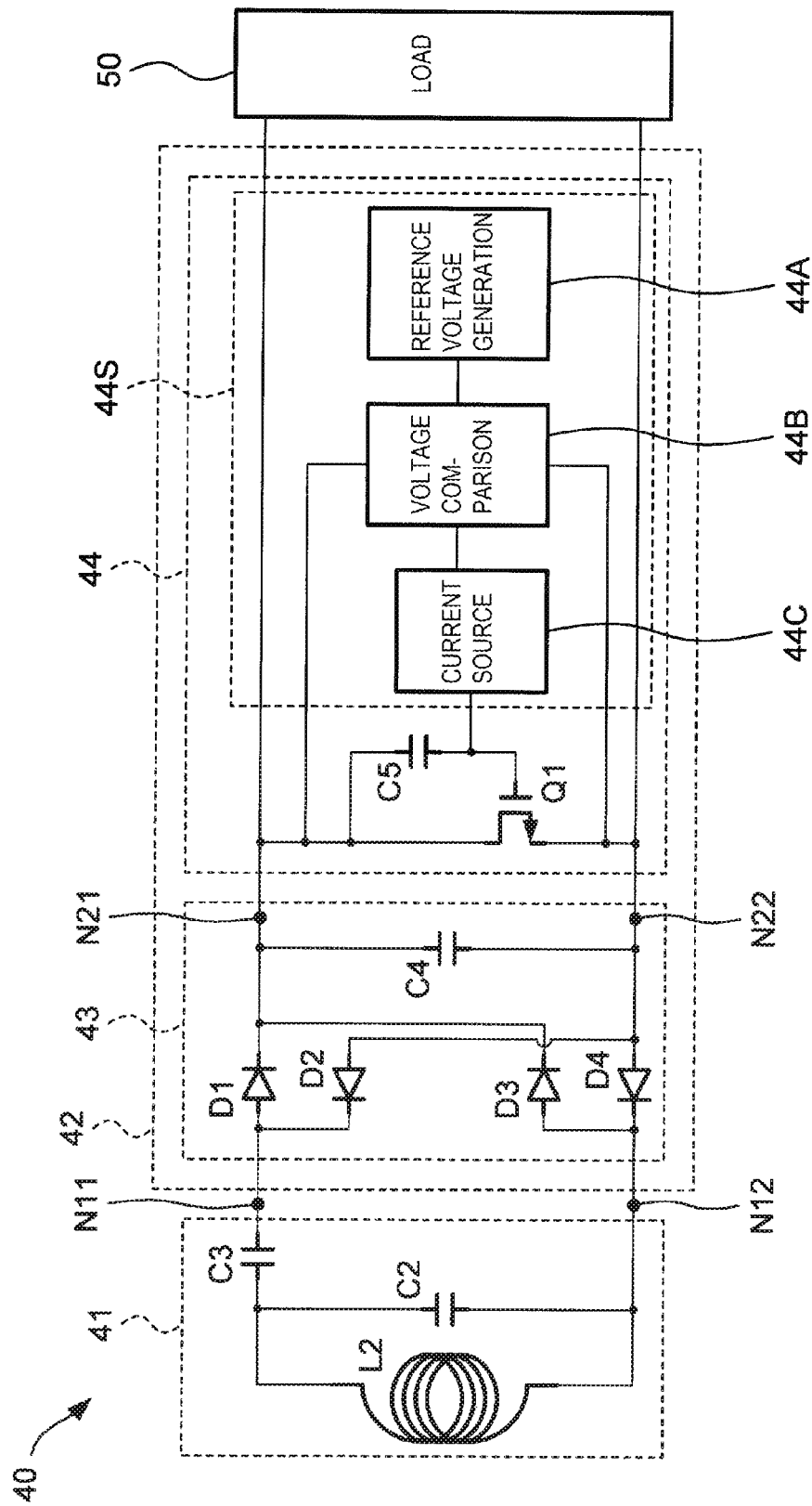
FIG. 2 is a circuit diagram of the power reception device according to Embodiment 1.

FIG. 2 is a circuit diagram of the power reception device 40. An example of a configuration of the power reception device 40 will be explained with reference to FIG. 2. First, the resonance circuit 41 has the capacitor C2 connected in parallel with the coil L2, and a capacitor C3 connected in series to the coil L2. The capacitors C2 and C3 function as matching capacitors that perform frequency matching between the resonance circuits 41 and 21.

Also, the resonance circuit 41 has a pair of voltage output terminals N11 and N12 that output alternating current voltages (sometimes referred to below as first and second alternating current voltage output terminals). In the present embodiment, the first alternating current voltage output terminal N11 is the terminal of the capacitor C3 on the opposite side to the connection terminal thereof that connects to the coil L2. The second alternating current voltage output terminal N12 is the terminal of the capacitor C2 and the coil L2 on the opposite side to the connection terminal thereof that connects to the capacitor C3. The first and second alternating current voltage output terminals N11 and N12 function as the power reception terminals in the power reception device 40.

Next, a configuration example of the reception control unit 42 will be explained. The reception control unit 42 has a rectifier circuit 43 that connects to the alternating current voltage output terminals N11 and N12 in the resonance circuit 41 and converts the alternating current voltage to a direct current voltage. The rectifier circuit 43 converts the alternating current voltage outputted by the alternating current voltage output terminals N11 and N12 in the resonance circuit 41 to a direct current voltage.

Also, the rectifier circuit 43 has a pair of voltage output terminals N21 and N22 that output direct current voltages (sometimes referred to below as first and second direct current voltage output terminals). The first and second direct current voltage output terminals N21 and N22 of the rectifier circuit 43 are connected to the load circuit 50. The first and second direct current voltage output terminals N21 and N22 function as the power output terminals in the power reception device 40.

In the present embodiment, the rectifier circuit 43 has a diode D1 having an anode terminal that is connected to the first alternating current voltage output terminal N11, a diode D2 having a cathode terminal that is connected to the anode terminal of the diode D1, a diode D3 having an anode terminal connected to the second alternating current voltage output terminal N12, and a diode D4 having a cathode terminal that is connected to the anode terminal of the diode D3. A cathode terminal of the diode D1 is connected to a cathode terminal of the diode D3, and an anode terminal of the diode D2 is connected to an anode terminal of the diode D4.

Also, the rectifier circuit 43 has a capacitor C4 having a first end connected to the cathode terminal of the diode D1 and a second end connected to the anode terminal of the diode D4. The capacitor C4 is configured so as to smooth the direct current voltage in the rectifier circuit 43. In the present embodiment, the first direct current voltage output terminal N21 in the rectifier circuit 43 is the first end of the capacitor C4 and the second direct current voltage output terminal N22 is the second end of the capacitor C4.

Also, the reception control unit 42 has a voltage limiting circuit 44 that limits the voltage between the first and second direct current voltage output terminals N21 and N22 of the rectifier circuit 43, or in other words, the voltage outputted from the power reception device 40 (hereinafter referred to as the output voltage).

In the present embodiment, the voltage limiting circuit 44 has a transistor Q1 having the drain and the source thereof connected, respectively, to the first and second direct current voltage output terminals N21 and N22, and a capacitor C5 having a first end that is connected to the drain of the transistor Q1 and a second end that is connected to the gate of the transistor Q1. In the present embodiment, the transistor Q1 is an N-channel MOSFET.

Also, the voltage limiting circuit 44 has a gate driver circuit 44S that controls the gate voltage of the transistor Q1 according to the voltage between the first and second direct current voltage output terminals N21 and N22. The gate driver circuit 44S controls the gate voltage such that conduction between the drain and source of the transistor Q1 is switched on and off.

In the present embodiment, the gate driver circuit 44S has a reference voltage generation circuit 44A that generates a reference voltage (limiting voltage) that serves as a reference for limiting the voltage, and a voltage comparison circuit 44B that compares the reference voltage to the voltage between the first and second direct current voltage output terminals N21 and N22.

Also, the gate driver circuit 44S has a current source circuit 44C that controls the gate voltage by injecting and discharging electric charge to the second end of the capacitor C5 on the basis of the voltage comparison results by the voltage comparison circuit 44B.

The voltage comparison circuit 44B supplies to the current source circuit 44C a difference signal indicating the difference between the reference voltage and the voltage between the first and second direct current voltage output terminals N21 and N22, for example. The current source circuit 44C switches between charge injection to the capacitor C5 and charge discharge from the capacitor C5 on the basis of the difference signal.

If the voltage between the first and second direct current voltage output terminals N21 and N22 is higher than the reference voltage, then the current source circuit 44C injects charge to the second end of the capacitor C5, thereby allowing conduction between the drain and the source of the transistor Q1, for example. If the voltage between the first and second direct current voltage output terminals N21 and N22 is lower than the reference voltage, then the current source circuit 44C discharges (extracts) charge from the second end of the capacitor C4, thereby preventing conduction between the drain and the source of the transistor Q1.

Figure 3:
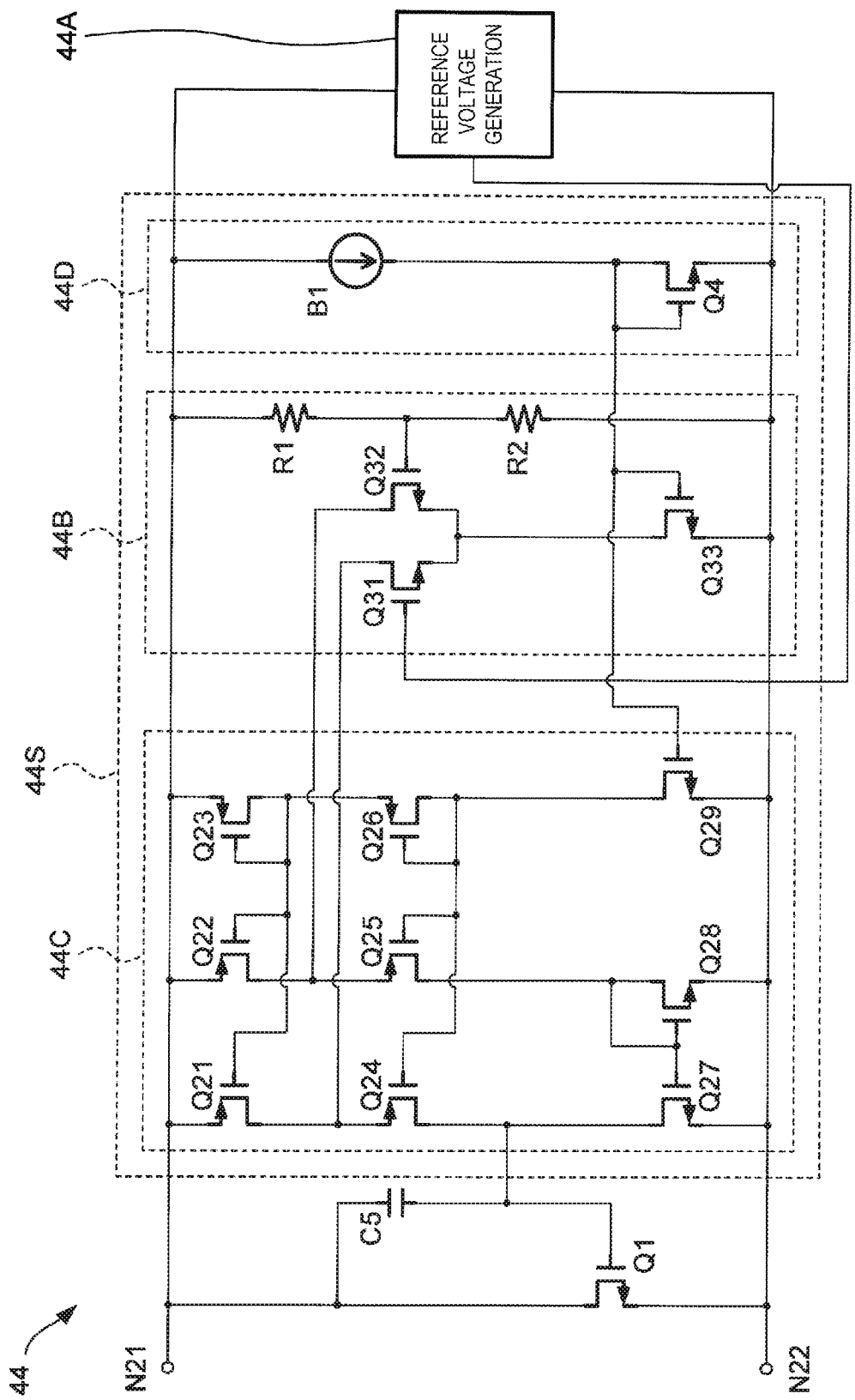
FIG. 3 is a circuit diagram of a voltage limiting circuit in the power reception device according to Embodiment 1.

FIG. 3 is a circuit diagram of the voltage limiting circuit 44. A configuration example of the voltage limiting circuit 44 will be explained with reference to FIG. 3. In the present embodiment, the voltage comparison circuit 44B is a differential amplifier circuit constituted of a plurality of transistors and resistors. Also, the current source circuit 44C is a current mirror circuit constituted of a plurality of transistors.

More specifically, in the present embodiment, the current source circuit 44C has transistors Q21, Q22, and Q23, the sources of which are connected to the first direct current voltage output terminal N21, and transistors Q24, Q25, and Q26, the sources of which are connected to the drains of the transistors Q21, Q22, and Q23, respectively.

The gates of the transistors Q21, Q22, and Q23 are connected to each other. Also, the gates of the transistors Q24, Q25, and Q26 are connected to each other. In the present embodiment, the transistors Q21 to Q26 are P-channel MOSFETs.

The current source circuit 44C also has transistors Q27, Q28, and Q29, the sources of which are connected to the second direct current voltage output terminal N22. In the present embodiment, the transistors Q27 to Q29 are N-channel MOSFETs.

The drain of the transistor Q27 is connected to the drain of the transistor Q24. The drains of the transistors Q28 and Q29 are connected to the drains of the transistors Q25 and Q26, respectively. Also, the gates of the transistors Q27 and Q28 are connected to each other. The gate and drain of the transistor Q28 are connected to each other.

The drains of the transistors Q21 and Q22 are connected to the voltage comparison circuit 44B. Also, the gate of the transistor Q29 is connected to the voltage comparison circuit 44B. Additionally, the drain of the transistor Q24 is connected to the second end of the capacitor C5 and the gate of the transistor Q1.

The voltage comparison circuit 44B has a transistor Q31, the drain of which is connected to the drain of the transistor Q21 in the current source circuit 44C, and a transistor Q32, the drain of which is connected to the drain of the transistor Q22 in the current source circuit 44C. The voltage comparison circuit 44B also has a transistor Q33, the drain of which is connected to the sources of the transistors Q31 and Q32, and the source of which is connected to the second direct current voltage output terminal N22. In the present embodiment, the transistors Q31 to Q33 are N-channel MOSFETs.

Also, the voltage comparison circuit 44B has resistors R1 and R2 that are connected in series between the first and second direct current voltage output terminals N21 and N22. The first end of the resistor R1 is connected to the first direct current voltage output terminal N21 and the second end of the resistor R1 is connected to the first end of the resistor R2. The second end of the resistor R2 is connected to the second direct current voltage output terminal N22. The gate of the transistor Q32 is connected to the second end of the resistor R1.

Also, the gate of the transistors Q31 is connected to the reference voltage generation circuit 44A. The gate of the transistor Q33 is connected to the gate of the transistor Q29 in the current source circuit 44C.

In the present embodiment, the voltage limiting circuit 44 has a biasing circuit 44D that serves as the operation source for the voltage comparison circuit 44B and the current source circuit 44C. The biasing circuit 44D has a bias current source B1 connected to the first direct current voltage output terminal N21 and a transistor Q4, the drain of which is connected to the bias current source B1.

The source of the transistor Q4 is connected to the second direct current voltage output terminal N22. Also, the gate of the transistor Q4 is connected to the drain of the transistor Q4. The gate of the transistor Q4 is also connected to the gate of the transistor Q33 in the voltage comparison circuit 44B and the gate of the transistor Q29 in the current source circuit 44C. In the present embodiment, the transistor Q4 is an N-channel MOSFET.

In the present embodiment, for example, the voltage limiting circuit 44 is configured as an integrated circuit excluding the capacitor C5 and the transistor Q1. The capacitor C5 and the transistor Q1 may be configured as external components to the integrated circuit that may be connected via external wiring, for example.

Figure 4:
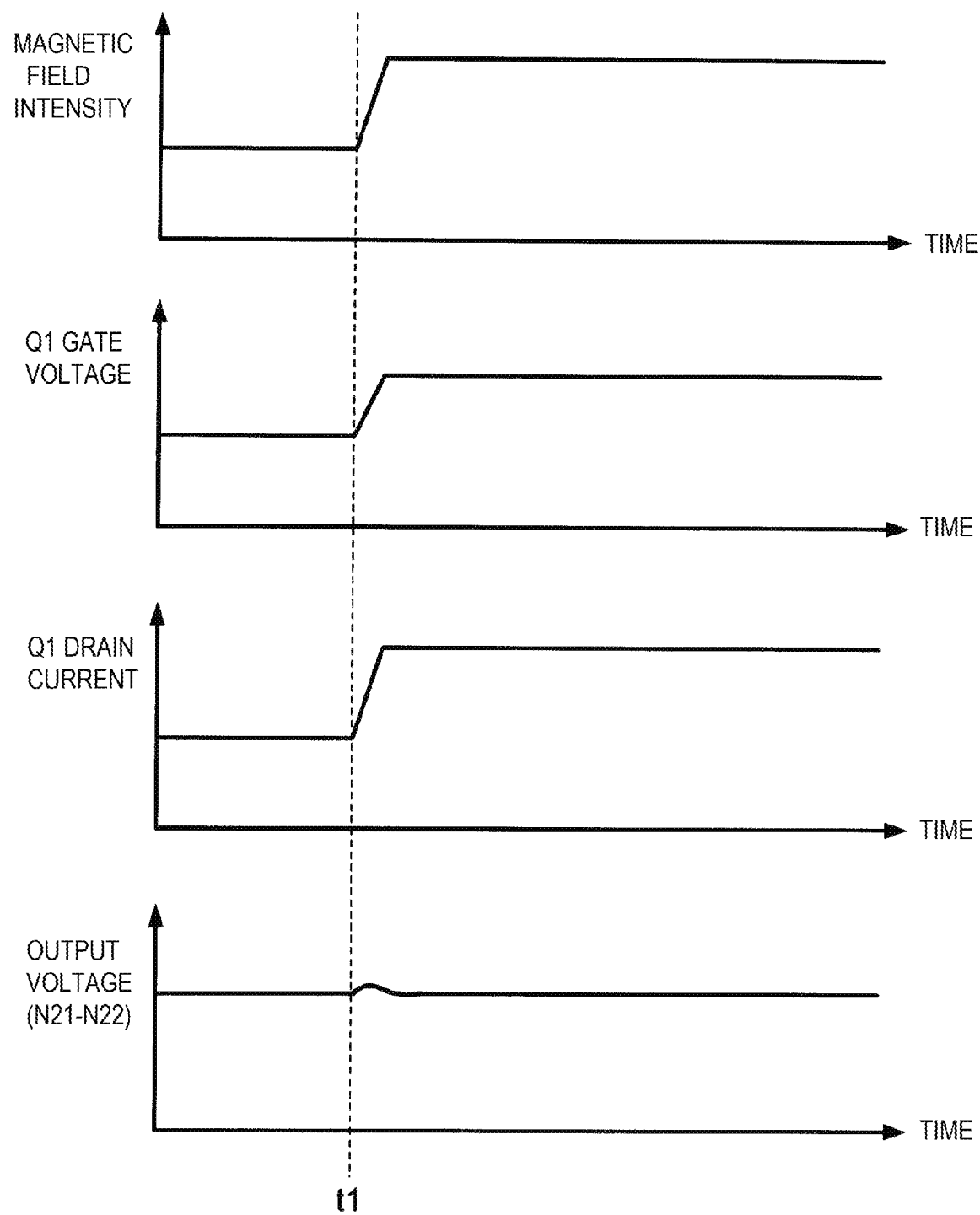
FIG. 4 shows timing charts indicating the change in intensity of a magnetic field applied to the power reception device according to Embodiment 1, and the changes in the voltages and current generated in the power reception device.

FIG. 4 schematically shows waveforms of a magnetic field inputted to the power reception device 40 and the voltages and current generated in the power reception device 40. An operation example of the power reception device 40 will be explained with reference to FIG. 4. FIG. 4 shows an operation example (response characteristics) of the power reception device 40 for when a stronger magnetic field than that corresponding to the reference voltage is inputted to the power reception device 40 at a timing t1 in the middle of a normal power reception operation.

First, the operation of the voltage limiting circuit 44 during the period prior to the timing t1, or in other words, when the voltage between the first and second direct current voltage output terminals N21 and N22 is less than or equal to the reference voltage will be described. In this case, the current source circuit 44C discharges the charge to the second end of the capacitor C5 to prevent conduction (set a high resistance) between the source and drain of the transistor Q1.

A scenario is considered below in which, at the timing t1 in the middle of this operation state, the magnetic field applied to the resonance circuit 41, or in other words, to the coil L2 suddenly increases. In such a case, the direct current voltage generated by the rectifier circuit 43 undergoes an abrupt increase. As a result, the voltage inputted to the voltage limiting circuit 44 through the first and second direct current voltage output terminals N21 and N22 increases.

In the present embodiment, the capacitance of the capacitor C5 is set so as to be sufficiently greater than the parasitic capacitance of peripheral circuits such as the capacitance of the capacitor C4 of the rectifier circuit 43 and the gate capacitance of the transistor Q1. The capacitor C5 has a capacitance of approximately 1 μF, for example. The transistor Q1 is, for example, configured to handle driving by a large current (with a gate capacitance of several hundred pF, for example).

Therefore, at the timing t1, the voltage on both ends of the capacitor C5 instantly increases. As a result, when the gate voltage (voltage between gate and drain) of the transistor Q1 increases, conduction is allowed (resistance is set to be low) between the source and drain of the transistor Q1, and the drain current instantly increases.

Thereafter, as a result of the operation of the gate driver circuit 44S, the gate voltage of the transistor Q1 increases. Thus, current flows between the source and the drain of the transistor Q1 until the voltage between the first and second direct current voltage output terminals N21 and N22 is less than the reference voltage.

As a result, there is almost no change, before and after the timing t1, in the voltage between the first and second direct current voltage output terminals N21 and N22, which is the output voltage of the power reception device 40. Thus, even if an excessive magnetic field is inputted at the timing t1, the voltage outputted by the power reception device 40 before and after this timing is stable. As a result, application of excessive voltage to the load circuit 50 is mitigated, and the operation of the load circuit 50 is stabilized.

Additionally, in the present embodiment, only the gate of the transistor Q1 and the current source circuit 44C are connected to the second end of the capacitor C5. Thus, almost no current flows to the gate of the transistor Q1. Therefore, the current needed by the current source circuit 44C in order to inject and discharge charge to/from the capacitor C5 is small.

Thus, the amount of time required to inject or discharge charge to/from the capacitor C5 at a capacitance of 1 μF in order to adjust the voltage by 1V, for example, is approximately one second. This amount of time is adequate for wireless charging of an electronic device. The current that the biasing circuit 44D needs to supply to the voltage comparison circuit 44B and the current source circuit 44C, for example, is a few μA. Thus, it is possible to perform voltage limiting in a stable manner with low power consumption.

Also, by adjusting the resistance of the resistors R1 and R2, it is possible to adjust the output voltage to be limited without adjusting the reference voltage. Thus, the flexibility in voltage limiting can be improved, with voltage limiting being able to be performed at a high degree of accuracy, for example.

The above-mentioned configuration of the electronic system 10 and the configuration of the power reception device 40 constitute merely one example. For example, the configuration of the voltage comparison circuit 44B and the current source circuit 44C shown in FIG. 3 constitute merely one example. The connection configuration between the resistors R1 and R2 shown in FIG. 3 constitutes merely one example.

Also, in the present embodiment, an electronic system 10 that performs power transmission through an alternating current magnetic field with a frequency of 13.56 MHz was described, for example. However, the characteristics of the magnetic field for power transmission can be adjusted in various ways. For example, the electronic system 10 may be configured to perform power transmission through an alternating current magnetic field at a different frequency such as 6.78 MHz or 100 kHz.

In the present embodiment, the resonance circuit 41 generates an alternating current voltage through the application of an alternating current magnetic field. However, the resonance circuit 41 may be configured to generate an alternating current voltage by applying magnetic fields having various characteristics.

Also, in the present embodiment, a case is described in which the electronic system 10 performs power transmission wirelessly. However, the power reception device 40 may be configured so as to apply a magnetic field through wires, for example. In other words, the power reception device 40 may receive power from various devices that can apply a magnetic field from outside the power reception device 40. The power reception device 40 may have any configuration as long as it has the coil L2 and the capacitor C2, and it has the resonance circuit 41 that generates an alternating current voltage through application of the alternating current magnetic field to the coil L2 and supplies the alternating current voltage to the rectifier circuit 43.

As described, in the present embodiment, the power reception device 40 has: the rectifier circuit 43, which generates a direct current voltage by having applied thereto an alternating current voltage, and has the first and second output terminals N21 and N22 that output the direct current voltage; the transistor Q1, the drain and source of which are connected between the first and second output terminals N21 and N22; the gate driver circuit 44S, which controls the voltage applied to the gate of the transistor Q1 on the basis of the voltage between the first and second output terminals N21 and N22; and the capacitor C5, the first end of which is connected to the drain of the transistor Q1, and the second end of which is connected to the gate of the transistor Q1. Thus, it is possible to provide the power reception device 40, which can limit the supply of reception voltage to the load circuit 50 with a high degree of responsiveness even if the reception voltage were to suddenly increase.

Embodiment 2

Figure 5:
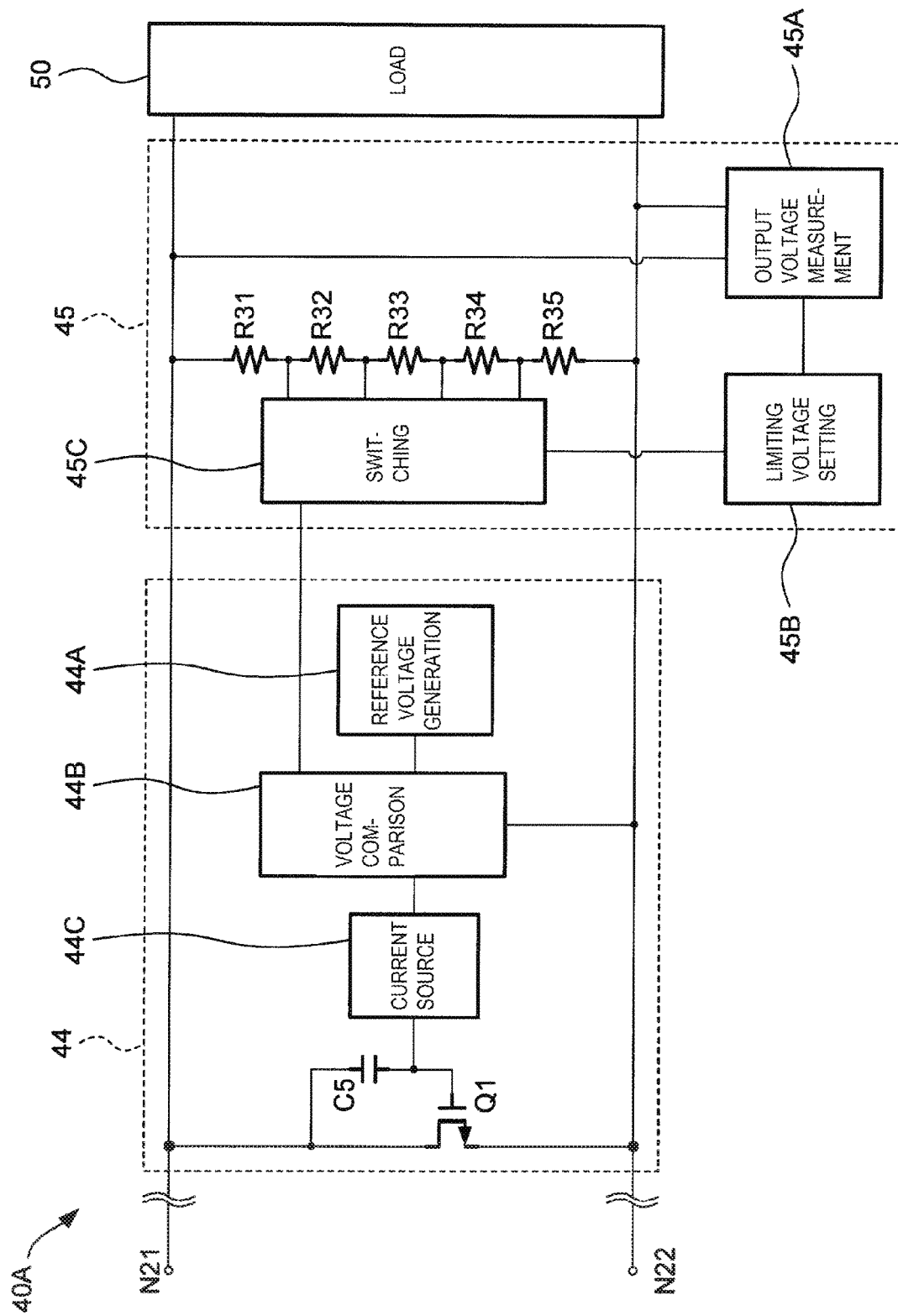
FIG. 5 is a circuit diagram of a power reception device according to a modification example of Embodiment 1.

FIG. 5 is a circuit diagram of the power reception device 40A according to Embodiment 2. The power reception device 40A has a similar configuration to the power reception device 40, except the power reception device 40A further includes a limiting voltage adjusting circuit 45 that adjusts a voltage (hereinafter referred to as the limiting voltage) that limits the voltage between the first and second direct current voltage output terminals N21 and N22.

In the present embodiment, the limiting voltage adjusting circuit 45 has a resistor ladder constituted of resistors R31, R32, R33, R34, and R35 that are connected in series between the first and second direct current voltage output terminals N21 and N22, and that can switch the connection state between the first direct current voltage output terminal N21 and the voltage comparison circuit 44B.

Also, the limiting voltage adjusting circuit 45 has an output voltage measurement circuit 45A that measures the voltage between the first and second direct current voltage output terminals N21 and N22; and a limiting voltage setting circuit 45B that sets the limiting voltage on the basis of the measurement results for the voltage between the first and second direct current voltage output terminals N21 and N22. Also, the limiting voltage adjusting circuit 45 has a switching circuit 45C that switches the connection state between the resistors R31 to R35 and the input terminal of the voltage comparison circuit 44B.

In the present embodiment, the voltage comparison circuit 44B compares the reference voltage to a voltage adjusted by the limiting voltage adjusting circuit 45. In the present embodiment, for example, the gate of the transistor Q32 is connected through the switching circuit 45C to any of the resistors R31 to R35.

The current source circuit 44C performs injection of a charge to, and discharge of the charge from, the second end of the capacitor C5 on the basis of the difference between the two voltages. If the limiting voltage setting circuit 45B causes the switching circuit 45C to perform a switching operation such that the second end of the resistor R31 is connected to the voltage comparison circuit 44B, then the voltage between the first and second direct current voltage output terminals N21 and N22 is limited to the voltage between the first and second direct current voltage output terminals N21 and N22 solely through the resistor R31. Also, the setting of the limiting voltage is performed on the basis of the voltage, actually measured by the output voltage measurement circuit 45C, between the first and second direct current voltage output terminals N21 and N22.

Figure 6:
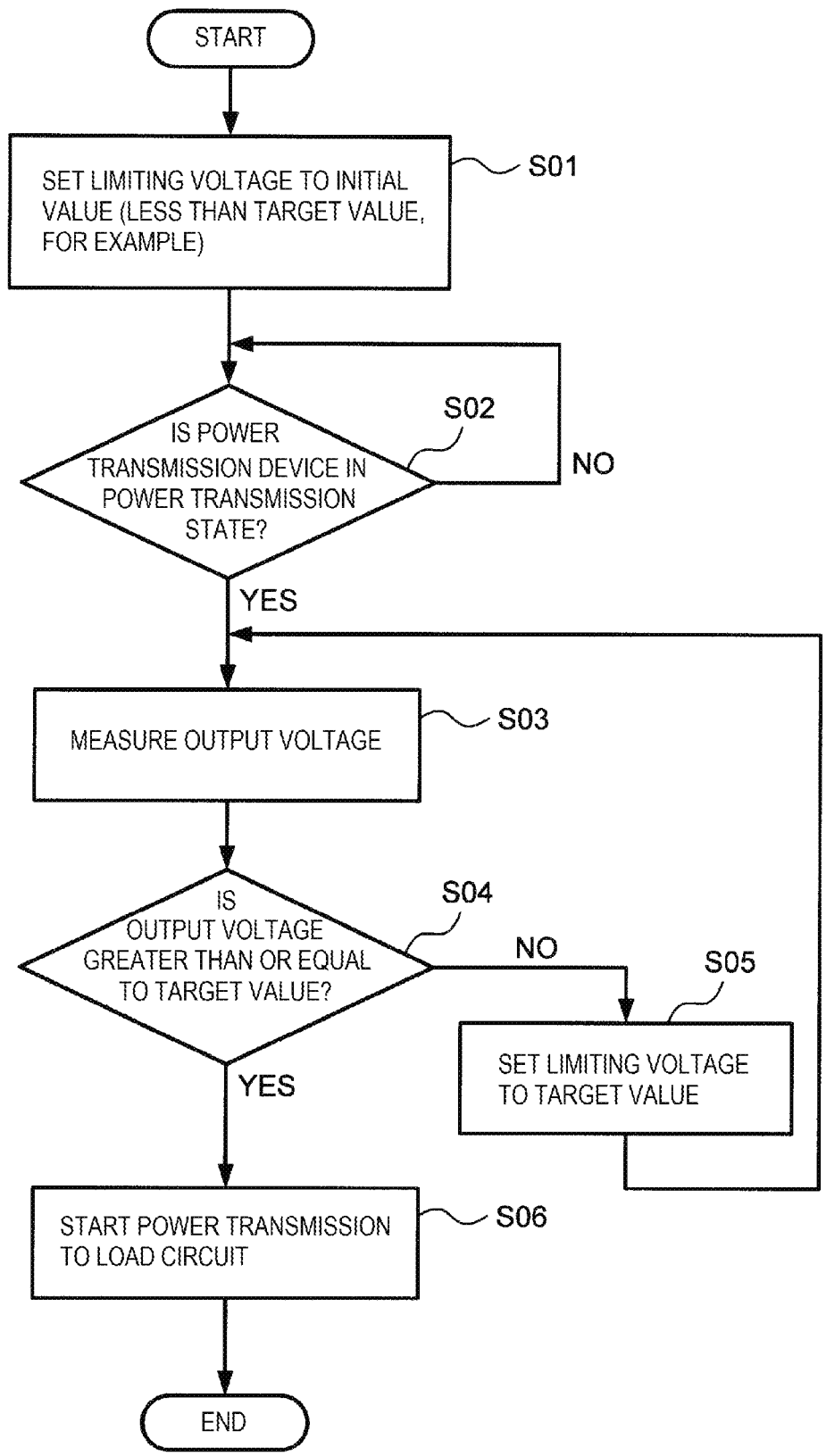
FIG. 6 shows an operation flow of the power reception device according to a modification example of Embodiment 1.

FIG. 6 shows an operation flow of the power reception device 40A. An operation example of the power reception device 40A will be explained with reference to FIG. 6. In the present embodiment, first, the limiting voltage setting circuit 45B sets the voltage between the first and second direct current voltage output terminals N21 to N22 to a prescribed initial value during a prescribed period (first period or power reception initial period) from when output of a direct current voltage from the first and second direct current voltage output terminals N21 and N22 of the rectifier circuit 43 is started (step S01).

The limiting voltage at the initial value would be at a smaller value than a target value, for example (if the target value is 5V, for example, the initial value is set to 4V). The initial value of the limiting voltage should be a value calculated on the basis of characteristics of an initial transmission voltage set by the electronic device 20 (power transmission device).

Next, the voltage limiting circuit 44 determines whether or not the electronic device 20 is in a state of transmitting power (transitioned from the initial state to the power transmitting state) (step S02). The voltage limiting circuit 44 determines whether or not the electronic device 20 is in a power transmission state by acquiring, from the electronic device 20, information pertaining to the operation state of the electronic device 20, or determining whether a predetermined period to the power transmission state has elapsed, for example. In the power transmission state, the electronic device 20 outputs a magnetic field corresponding to a higher voltage than the initial state, for example.

Next, the output voltage measurement circuit 45A measures the voltage between the first and second direct current voltage output terminals N21 and N22 (step S03). Here, an actual measurement is taken of the voltage between the first and second direct current voltage output terminals N21 and N22.

Next, the limiting voltage setting circuit 45B determines whether or not the measured output voltage is greater than or equal to a target voltage (step S04). In other words, the limiting voltage setting circuit 45B determines whether or not a voltage suitable to a state of supplying power to the load circuit 50 has been received.

If the output voltage is determined not to be less than the target value, the limiting voltage setting circuit 45B controls the switching circuit 45C to adjust the limiting voltage to the target value (setting the voltage to 5V, for example) (step S05). As a result, it is possible to limit the output voltage such that an output voltage matching the transmission voltage when the electronic device 20 is actually transmitting power is outputted, for example.

Next, if the output voltage is determined to be at the target value or greater, the voltage limiting circuit 44 connects the rectifier circuit 43 to the load circuit 50 and starts transmitting power to the load circuit 50 (step S06). Thus, in the power reception device 40A, the limiting voltage adjusting circuit 45 measures the actual output voltage and performs a power reception operation while adjusting the output voltage to be limited by the voltage limiting circuit 44. Therefore, it is possible to limit the reception voltage at a high accuracy such as by receiving stable power (power supply) despite manufacturing variation in the elements inside the circuit or changes in ambient temperature, for example.

The limiting voltage setting circuit 45B of the limiting voltage adjusting circuit 45 sets the limiting voltage to a first value (initial value, for example) during a first period after the rectifier circuit 43 starts outputting direct current voltage from the first and second direct current voltage output terminals N21 and N22, and sets the limiting voltage to a second value (target value, for example) that is higher than the first value during a second period that follows the first period. As a result, it is possible to perform voltage limiting in an accurate and safe manner even during the start of operations before preparation for transmitting power between the electronic devices 20 and 30 is complete, for example.

The above-mentioned configurations and operations constitute merely one example. For example, the configuration of the limiting voltage adjusting circuit 45 constitutes merely one example. Also, the connective configuration of the resistors R31 to R35 constitutes merely one example.

What is claimed is:

1. A power reception device, comprising:
    a rectifier circuit that is configured to receive an alternating current voltage and to generate a direct current voltage based on the alternating current voltage, the rectifier circuit having first and second output terminals that are configured to output the direct current voltage;
    a transistor having a drain and a source that are connected, respectively, to the first and second output terminals;
    a gate driver circuit that is configured to control a gate voltage of the transistor according to a voltage between the first and second output terminals; and
    a capacitor having a first end connected to the drain of the transistor and a second end connected to the gate of the transistor,
    wherein the gate driver circuit includes a current source circuit having an output connected to the first end of the capacitor and the gate of the transistor.

2. The power reception device according to claim 1, wherein a capacitance of the capacitor is greater than a gate capacitance of the transistor.

3. The power reception device according to claim 1, further comprising:
    a resonance circuit that has a coil and a capacitor, that is configured to generate the alternating current voltage based on an application of an alternating current magnetic field to the coil, the resonance circuit configured to supply the alternating current voltage to the rectifier circuit.

4. The power reception device according to claim 3, wherein the resonance circuit has a resonant frequency of 13.56 MHz.

5. The power reception device according to claim 1, wherein the gate driver circuit comprises:
a reference voltage generation circuit that is configured to generate a reference voltage;
a voltage comparison circuit that is configured to compare the reference voltage to a voltage between the first and second output terminals; and
a current source circuit that is configured to inject a charge to the second end of the capacitor based on the voltage between the first and second output terminals being higher than the reference voltage, and to discharge the charge from the second end of the capacitor based on the voltage between the first and second output terminals being lower than the reference voltage.

6. The power reception device according to claim 1, further comprising:
a limiting voltage adjusting circuit that is configured to adjust a limiting voltage that limits the voltage between the first and second output terminals.

7. The power reception device according to claim 6, wherein the limiting voltage adjusting circuit comprises:
an output voltage measurement circuit that is configured to measure the voltage between the first and second output terminals; and
a limiting voltage setting circuit that is configured to set the limiting voltage on the basis of the voltage between the first and second output terminals measured by the output voltage measurement circuit.

8. The power reception device according to claim 7, wherein the limiting voltage setting circuit is configured to set the limiting voltage to a first value during a first period after the rectifier circuit starts outputting the direct current voltage, and set the limiting voltage to a second value that is greater than the first value during a second period after the first period.

* * * * *